US012154780B2

(12) United States Patent
Makarov et al.

(10) Patent No.: US 12,154,780 B2
(45) Date of Patent: Nov. 26, 2024

(54) MASS SPECTROMETER USING UNITARY INSERT BETWEEN FIRST AND SECOND ION TRAPS

(71) Applicant: Thermo Fisher Scientific (Bremen) GmbH, Bremen (DE)

(72) Inventors: Alexander A. Makarov, Bremen (DE); Wilko Balschun, Bremen (DE); Jan-Peter Hauschild, Weyhe (DE); Aivaras Venckus, Bremen (DE); Denis Chernyshev, Bremen (DE); Eduard V. Denisov, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 423 days.

(21) Appl. No.: 16/878,832

(22) Filed: May 20, 2020

(65) Prior Publication Data

US 2020/0388480 A1 Dec. 10, 2020

(30) Foreign Application Priority Data

May 22, 2019 (GB) ..................................... 1907211

(51) Int. Cl.
*H01J 49/42* (2006.01)
*H01J 49/06* (2006.01)

(52) U.S. Cl.
CPC .......... *H01J 49/425* (2013.01); *H01J 49/061* (2013.01); *H01J 49/067* (2013.01); *H01J 49/068* (2013.01)

(58) Field of Classification Search
CPC ...... H01J 49/425; H01J 49/061; H01J 49/067; H01J 49/068; H01J 49/427; H01J 49/16; H01J 49/423; H01J 49/02; H01J 49/4255
See application file for complete search history.

(56) References Cited

U.S. PATENT DOCUMENTS 5,886,346 A * 3/1999 Makarov .............. H01J 49/425 250/291
8,933,397 B1 1/2015 Hanson
(Continued)

FOREIGN PATENT DOCUMENTS

EP 2431997 3/2012
GB 2219432 12/1989
(Continued)

OTHER PUBLICATIONS

Combined Search and Examination Report mailed on Oct. 31, 2019, to GB Patent Application No. 1907211.5.
(Continued)

*Primary Examiner* — David A Vanore
(74) *Attorney, Agent, or Firm* — Klarquist Sparkman, LLP

(57) ABSTRACT

The present invention provides a mass spectrometer comprising a first ion trap, a second ion trap, a lens stack for directing ions from the first ion trap to the second ion trap and a housing. The first ion trap is arranged to form a linear or curved potential well and the second ion trap is an electrostatic ion trap, for example, an orbital ion trap, arranged to form an annular potential well. The mass spectrometer further comprises a unitary insert comprising a first cavity which holds the lens stack and a second cavity which holds the second ion trap, wherein the insert is inserted within the housing.

36 Claims, 11 Drawing Sheets

(56) References Cited

U.S. PATENT DOCUMENTS

| | | | | |
|---|---|---|---|---|
| 2005/0121609 A1* | 6/2005 | Makarov | B82Y 30/00 250/290 |
| 2007/0114391 A1* | 5/2007 | Mordehai | H01J 49/423 250/290 |
| 2014/0224995 A1* | 8/2014 | Kholomeev | H01J 49/025 250/395 |
| 2014/0346345 A1* | 11/2014 | Makarov | H01J 49/06 250/283 |
| 2015/0056060 A1* | 2/2015 | Makarov | F04D 19/046 415/1 |
| 2016/0293395 A1* | 10/2016 | O'Brien | H01J 49/24 |

FOREIGN PATENT DOCUMENTS

| | | |
|---|---|---|
| GB | 2495173 A | 4/2013 |
| WO | WO 94/29006 | 12/1994 |
| WO | WO-2012152949 A1 | 11/2012 |
| WO | WO 2019/229459 | 12/2019 |

OTHER PUBLICATIONS

Combined Search and Examination Report mailed on Nov. 11, 2021, for GB Patent Application No. 2007387.0.

Combined Search and Examination Report issued for GB Application No. GB2113382.2 on Mar. 7, 2022.

* cited by examiner

MASS SPECTROMETER USING UNITARY INSERT BETWEEN FIRST AND SECOND ION TRAPS

PRIORITY

This application claims priority to UK Patent Application 1907211.5, filed on May 22, 2019, and titled "A Mass Spectrometer," by Alexander A. Makarov et al, which is hereby incorporated herein by reference in its entirety.

FIELD OF INVENTION

The present invention relates to a mass spectrometer and components thereof. In particular, the following describes constructional details of a mass spectrometer that can improve the assembly of various components of the mass spectrometer, their sealing in evacuated manifolds, and their electromagnetic shielding. By improving the physical registration of various components of the mass spectrometer, their sealing and their electromagnetic shielding, more accurate mass spectra may be obtained.

BACKGROUND TO THE INVENTION

It is known in the field of mass spectrometry to direct ions from a curved ion trap defining a potential well in which the ions are stored, via a lens stack to an orbital ion trap forming a second annular potential well in which the ions follow an orbit. The curved ion trap is known in the art as a C-trap. The orbital ion trap utilizing quadro-logarithmic potential is known in the art as an Orbitrap® analyser. The lens stack is known in the art to comprise pairs of electrodes that act like ion lenses (as opposed to optical lenses actually comprising shaped solids of a particular refractive index).

Conventionally, the C-trap, lens stack, and Orbitrap® parts, are first built as separate assemblies and then subsequently connected together. The conventional approach does not recognise the need for accurate alignment of these three crucial components. Reliable sealing and an improved electromagnetic shielding of these components is desirable.

According to the invention, there is provided a mass spectrometer as set out in the claims.

A preferred embodiment of a mass spectrometer in accordance with the invention comprises: a first ion trap, the first ion trap being arranged to form a linear or curved potential well; a second ion trap, the second ion trap being an orbital ion trap arranged to form an annular potential well along a longitudinal axis that defines the longitudinal direction; a lens stack for directing ions from the first ion trap to the second ion trap; and a housing, wherein the mass spectrometer further comprises a unitary insert comprising a first cavity which holds the lens stack and a second cavity which holds the second ion trap, wherein the insert is inserted within the housing. Preferably, the potential well within the first ion trap is formed by a combination of pseudo-potential well created by radiofrequency (RF) voltages and static potential well created by DC voltages.

The second ion trap may be a mass analyser.

Preferably, the lens stack comprises a plurality of pairs of electrodes mounted on one or more alignment rods; the first ion trap directly engages at least one of the one or more alignment rods; the insert directly contacts and receives within the first cavity at least one of the plurality of pairs of electrodes; and the insert directly contacts and receives within the second cavity the second ion trap.

Preferably, the lens stack comprises a plurality of pairs of electrodes mounted on one or more alignment rods; the first ion trap directly engages at least one of the one or more alignment rods; the insert directly contacts and receives within the first cavity receives at least one of the one or more alignment rods; and the insert directly contacts and receives within the second cavity the second ion trap.

Preferably, the second ion trap comprises a spindle electrode extending through an annular cavity of a barrel electrode, the spindle electrode and barrel electrode separated by one or more insulating spacers; and the insert directly contacts and receives within the second cavity at least one of the one or more insulating spacer.

Preferably, the mass spectrometer further comprises a heating element for generating heat within the insert. This can enable bake-out of the system necessary for achieving ultra-high vacuum (UHV) conditions required for high resolution accurate mass (HR/AM) analysis in the second ion trap, which is preferably an orbital ion trap.

Preferably, the housing comprises a plurality of separate regions sealed from one another by a plurality of seals. For example, when the insert is inserted in the housing.

Preferably, at least one seal between the first ion trap region and the second ion trap region is a conductive seal. Preferable, the conductive seal is electrically conductive. Preferably one sealing partner in a part of the insert directly contacts the housing. Preferably, the conductive seal part of the insert is in electrical communication with the housing.

Preferably, both the insert and the housing are metal and the at least one seal is formed by metal-to-metal contact between the insert and the housing. Preferably, the at least one seal is formed by metal-to-metal pressure between the insert and the housing.

Preferably, a first ion trap region of the plurality of regions contains the first ion trap and is evacuated to a first pressure; a lens stack region of the plurality of regions contains the lens stack and is evacuated to a second pressure; a second ion trap region of the plurality of regions contains the second ion trap and is evacuated to a third pressure; and the first pressure is greater than the second pressure and the second pressure is greater than the third pressure.

Preferably, a cavity is formed within the first ion trap, the cavity having a pressure greater than the first pressure.

Preferably, a pressure ratio is maintained across each of the seals, and each pressure ratio is no smaller than 1:10, preferably no smaller than 1:100 and no greater than 1:1000.

Preferably, each of the seals is formed by engagement between a shoulder of the housing and a seal, for example a sealing face of the insert, so that the regions are separated by labyrinthine seals.

Preferably, a first seal is provided between the first ion trap region and the lens stack region, and the pressure ratio across the first seal is no less than 1:10, preferably no smaller than 1:100 and no greater than 1:1000.

Preferably, a pair of second seals is provided between the lens stack region and the second ion trap region, and the pressure ratio across each of the second seals is no less than 1:10, preferably no smaller than 1:100 and no greater than 1:1000.

Preferably, the pair of second seals are formed by contact between the insert and the housing; and a seal is formed by contact between the insert and a pair of electrodes of the lens stack.

Preferably, the first cavity is offset from the second cavity along a longitudinal axis extending through the insert; and the insert further comprises a plurality of sealing flanges extending outwardly from the longitudinal axis for engagement with the housing.

Preferably, the housing is conductive and the first ion trap is sealed from the second ion trap by a conductive seal that directly contacts the housing, the direct contact enabling electrical conduction between the insert and housing. The conductive seal may be, for example, a sealing face of the insert.

Preferably, the housing and the insert are conductive and the first ion trap is sealed from the second ion trap by direct contact between a sealing flange of the insert and the housing, the direct contact enabling electrical conduction between the insert and housing.

Preferably, the mass spectrometer further comprises two heat sensors mounted on or within the insert.

Another preferred embodiment of a mass spectrometer, comprises: a first ion trap, the first ion trap being arranged to form a linear or curved potential well; a second ion trap, the second ion trap being, in particular, an orbital ion trap arranged to form an annular potential well; a lens stack for directing ions from the first ion trap to the second ion trap; and a conductive housing, wherein: the housing comprises a plurality of separate regions, wherein the regions are sealed from one another when in contact with the insert; a first ion trap region of the plurality of regions contains the first ion trap; a lens stack region of the plurality of regions contains the lens stack; a second ion trap region of the plurality of regions contains the second ion trap; the first ion trap region is sealed from the second ion trap region by a conductive seal part of the insert that directly contacts the housing for enabling electrical conduction therebetween.

The second ion trap may be a mass analyser.

A further preferred embodiment of a mass spectrometer, comprises: a support structure and a mass analyser (ion trap) comprising an electrode assembly. The mass analyser extends along the longitudinal axis/longitudinal direction between a first end and a second end. The mass analyser is mounted to the support structure at the first end and the second end is free. Preferably the electrode assembly comprises electrodes arranged along the longitudinal direction. The electrodes/electrode assembly may extend between the first and second end in the longitudinal direction. Preferably the mass analyser is an electrostatic ion trap, in particular preferably an orbital ion trap, arranged to form an annular potential well.

Preferably, the mass analyser (ion trap) comprises the electrode assembly and an electrically insulating spacer, wherein the first electrically insulating spacer is at the first end of the mass analyser and forms a mounting surface for the mass analyser and is directly engaged with the support structure.

Preferably, the support structure comprises one or more biasing arrangement(s), preferably spring plates, directly engaged with an outer surface of the electrically insulating spacer and one or more hardstop plates directly engaged with an inner surface of the electrically insulating spacer, wherein the inner surface of the electrically insulating spacer is proximal to the electrode assembly of the mass analyser and the outer surface of the electrically insulating spacer is distal from the electrode assembly of the mass analyser. The inner and the outer surface of the electrically insulating spacer at the second end are normal to the longitudinal axis of the mass analyser.

Embodiments of mass spectrometers in accordance with the invention may be formed using a manufacturing method that comprises: providing a first ion trap for forming a linear or curved potential well; providing a second ion trap for forming an annular potential well; providing a lens stack connected to the first ion trap for directing ions from the first ion trap to the second ion trap; and providing a housing. The method also comprises the steps of: forming a unitary insert comprising a first cavity and a second cavity; locating the lens stack in the first cavity and the second ion trap in the second cavity to form an assembly; and inserting the assembly into the housing.

BRIEF DESCRIPTION OF THE DRAWINGS

For a better understanding of the invention and to show how the same may be put into effect, reference will now be made, by way of example only, to the accompanying drawings in which.

DETAILED DESCRIPTION OF EMBODIMENTS

Figure 1:
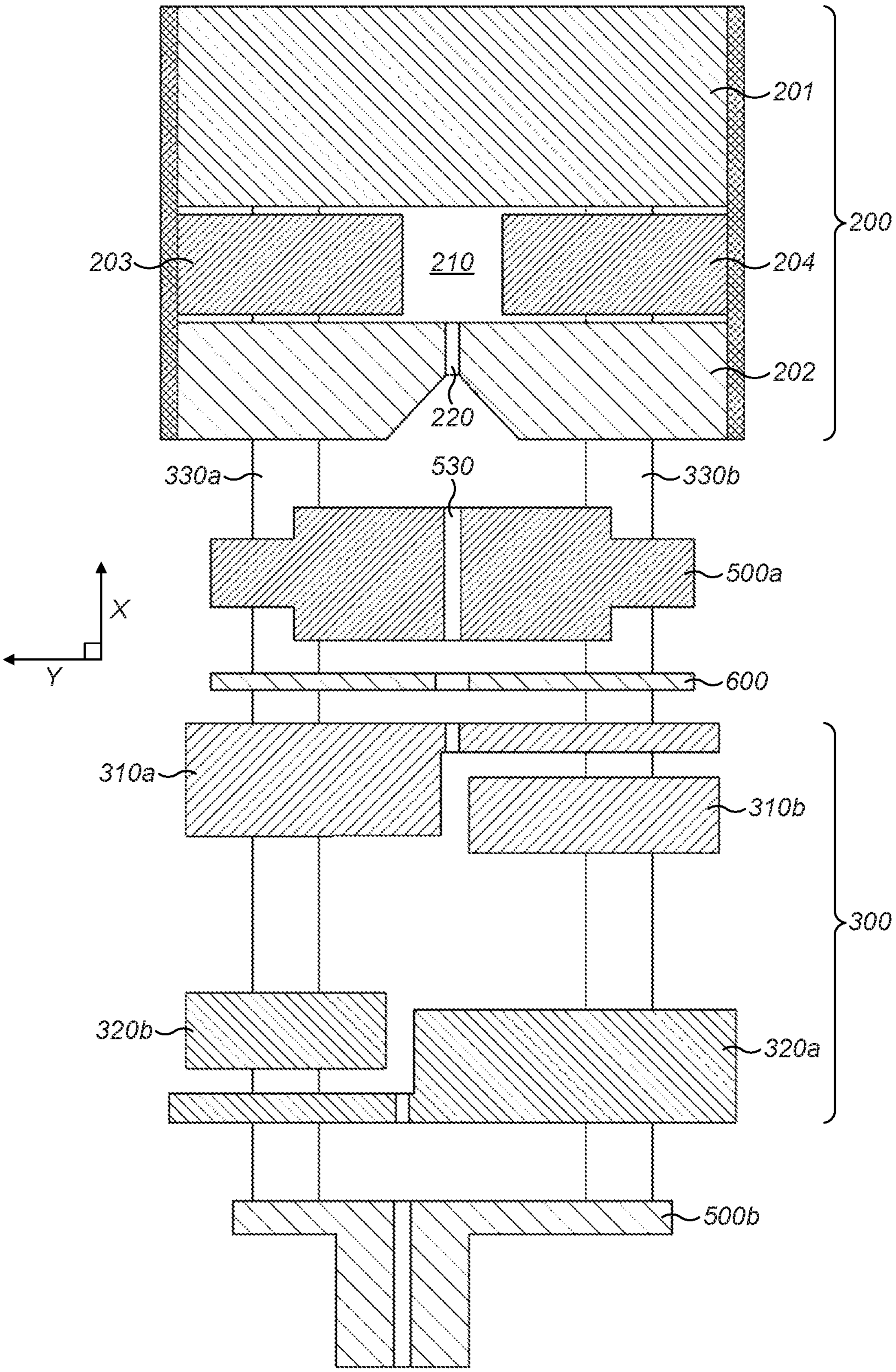
FIG. 1 shows a cross-section of a first ion trap and lens stack assembly.

FIG. 1 shows a first ion trap 200 and lens stack 300.

The first ion trap 200 is arranged such that in use it forms a linear or curved potential well in a cavity 210. In the case of a curved potential well, the first ion trap 200 would be of the form known in the art as a C-trap as shown in U.S. Pat. No. 8,017,909. The first ion trap 200 comprises top and bottom electrodes 201, 202. In use, the cavity 210 is evacuated to a vacuum pressure of around $10^{-3}$ mbar. It may, for example, have an inscribed radius of 3 m. In some embodiments, top and bottom electrodes 201, 202 of trap 200 receive one phase of RF, left and right electrodes 203, 204—the opposite phase of RF voltage. Typical amplitudes may be in the range 500 to 3000 V and frequencies in the range 2 to 4 MHz, preferably 3.1 MHz.

As is known in the art, the bottom electrode 202 of the first ion trap 200 will comprise an aperture or slit 220 for the ejection of ions. The aperture or slit 220 may have a length of, for example, 0.8 mm to 1 mm. Ejection of ions can be organized as described in the patent applications WO2008081334 or WO05124821. The slit may extend perpendicular to the plane of the drawing. Typically, these slits may have height of 1 mm and progressively reducing width from 10 mm to 1 mm to accommodate converging ion beam.

The lens stack 300 is arranged to direct ions from the first ion trap 200 to a second ion trap 400. The lens stack 300 comprises a plurality of components spaced apart in a longitudinal direction X.

The lens stack 300 has a series of apertures in the components thereof, the apertures collectively defining a lens stack path through the lens stack 300, through which ions may pass.

The lens stack 300 comprises a number of components for which accurate alignment is important. The lens stack 300 comprises at least a first pair of electrodes 310*a*, 310*b* and, preferably, a second pair of electrodes 320*a*, 320*b*.

Preferably, the aperture between the first pair of electrodes 310*a*, 310*b* is offset laterally (i.e. in a direction Y, perpendicular to the longitudinal direction X) from the aperture between the second pair of electrodes 320*a*, 320*b*. In this way, the two pairs of electrodes 310*a*, 310*b*, 320*a*, 320*b* define a "Z lens", as is known in the art. This can eliminate neutral gas emanating from the first trap 200 due to the absence of line-of-sight through the apertures of the Z lens.

The lens stack 300 may also comprise a first grounded lens 500*a* and a second grounded lens 500*b*, between which the electrodes of the lens stack 300 are located.

The lens stack 300 comprises one or more alignment rods 330*a*, 330*b*, on which the components of the lens stack 300 are mounted for accurate alignment. The components may be mounted by way of holes formed therein, complementary to the alignment rods 330*a*, 330*b*.

For example, the two pairs of electrodes 310*a*, 310*b*, 320*a*, 320*b* may include holes with a shape closely matching the cross-section of the alignment rods 330*a*, 330*b*. The alignment rods 330*a*, 330*b* may be ceramic.

The lens stack 300 may also comprise one or more spacers 600 for holding electrodes 310*a*, 310*b*, 320*a*, 320*b* in accurate alignment on the alignment rods 330*a*, 330*b*.

Both the alignment rods 330*a*, 330*b* and the holes in the lens stack components are preferably machined to a high tolerance.

Preferably, the first ion trap 200 is also mounted on the alignment rods 330*a*, 330*b*. In this way, the aperture 220 for the ejection of ions from the first ion trap 200 is accurately aligned with the path through the lens stack 300.

Figure 2:
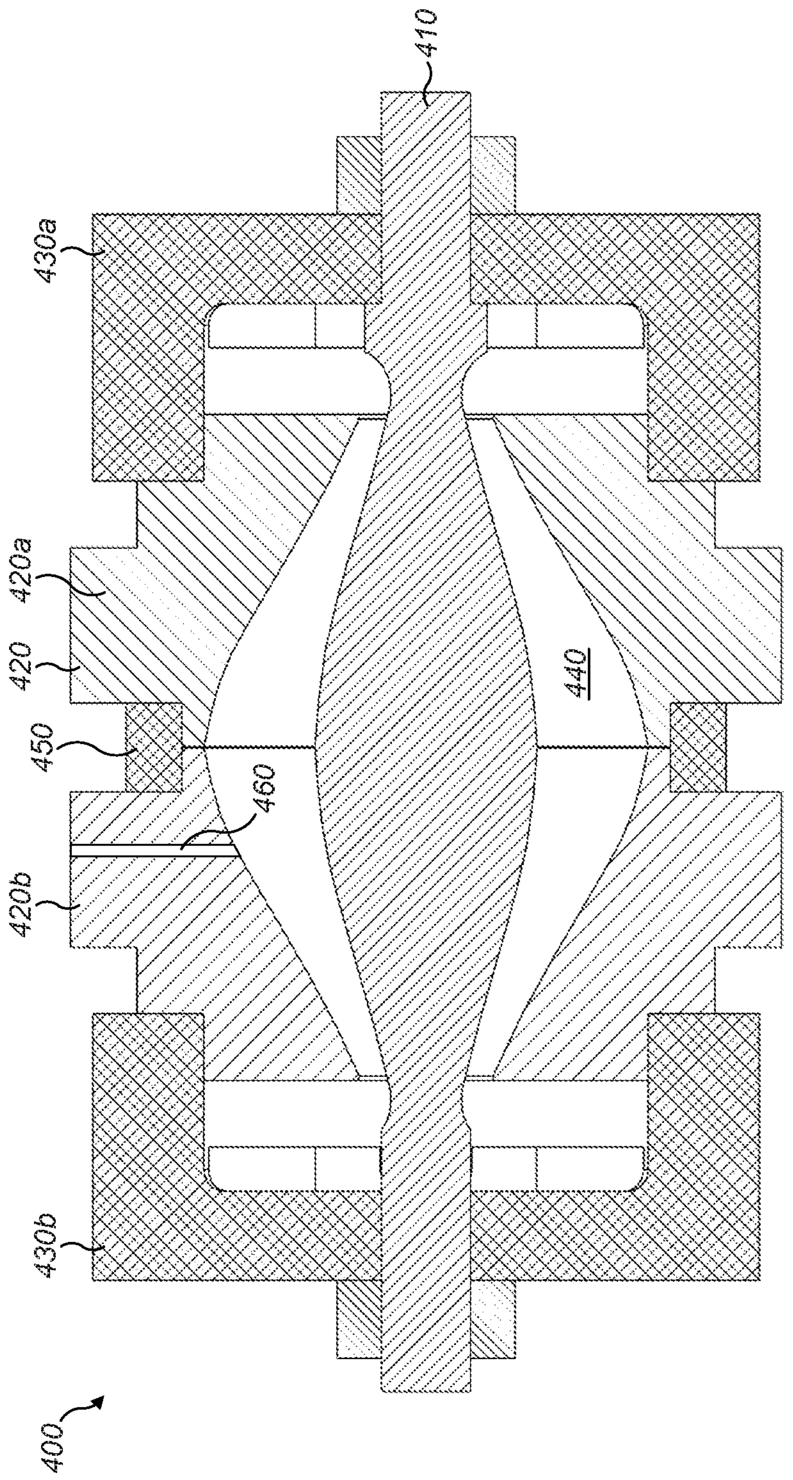
FIG. 2 shows a cross-section of a second ion trap.

FIG. 2 shows a cross-section of a second ion trap 400.

The second ion trap 400 comprises a spindle electrode 410 surrounded by an outer electrode 420. The outer electrode 420 may comprise, and preferably consist of, one or more (in this example, two) barrel electrodes 420*a* and 420*b*. The barrel electrode(s) 420*a*, 420*b* may be separated by an insulating ring 450. The spindle electrode 410 and barrel electrodes 420*a* and 420*b* collectively define a cavity 440.

The spindle electrode 410 and one or more barrel electrodes 420*a*, 420*b* are separated by one or more insulating spacers 430*a*, 430*b*, which may provide mounting surfaces for the second ion trap 400. The insulating spacers 430*a*, 430*b* are electrically insulating.

The second ion trap 400 is arranged to form an annular potential well in the cavity 440.

As is known in the art, the second ion trap 400 will comprise a schematically shown ion introduction channel 460 in the barrel electrode 420*b* for the injection of ions into the cavity 440. Such a configuration is known in the art, for example from WO2012152950A1 or U.S. Pat. No. 7,714,283.

Thus, the second ion trap 400 is preferably an orbital ion trap of an Orbitrap type.

Figure 3:
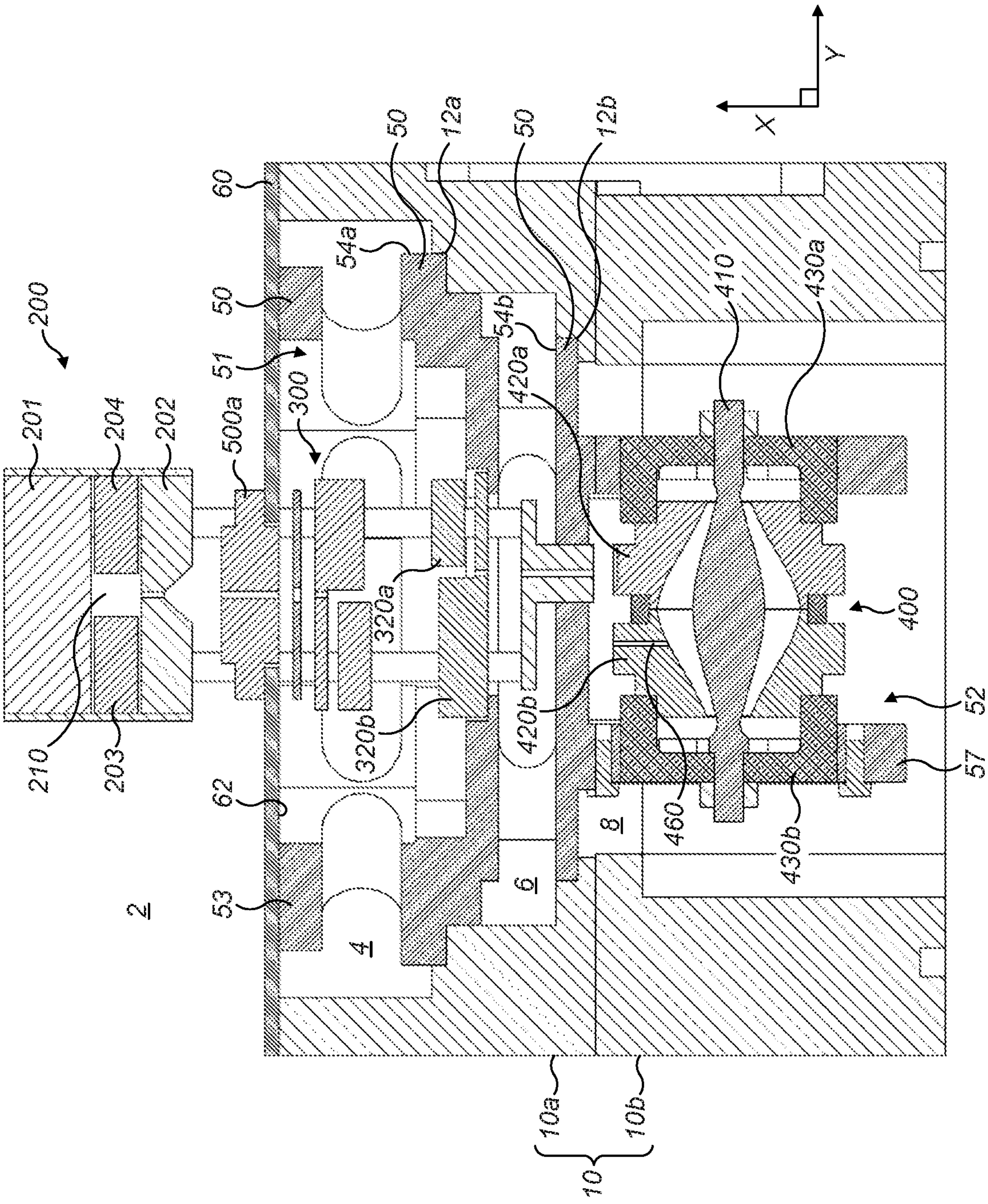
FIG. 3 shows a cross-section of an assembly of the components of FIGS. 1 and 2 for forming a portion of a mass spectrometer in accordance with a first embodiment.

FIG. 3 shows a cross-section of an assembly of the components of FIGS. 1 and 2 for forming a portion of mass spectrometer in accordance with a first embodiment.

As can be seen in FIG. 3, a mass spectrometer includes a housing component 10, which may comprise one or more subcomponents 10*a*, 10*b*. An insert 50 is inserted into the housing component 10. Preferably, the housing component 10 is a unitary body. Preferably, the housing 10 is formed of a conductive material, most preferably a metal, such as aluminium.

The insert 50 is a rigid unitary component comprising a first cavity 51 for receiving the lens stack 300 and a second cavity 52 for receiving the second ion trap 400. Preferably, the insert 50 is formed of a conductive material, most preferably a metal, such as aluminium, invar, stainless steel.

The first cavity 51 is offset from the second cavity 52 along an axis extending through the insert 50. In particular, the first cavity 51 is offset from the second cavity along the longitudinal axis X extending through the insert.

The lens stack 300 may engage the insert 50 directly with one or more of the lens components, and/or with one or more of the alignment rods 330*a*, 330*b* when located within the first cavity 51. The direct engagement between the lens stack 300 and the first cavity 51 of the insert 50 can allow accurate alignment of the first ion trap 200, the components of the lens stack 300, and the insert 50.

By direct engagement is meant that a surface of one component contacts a surface of another component.

The second ion trap 400 may engage the insert 50 directly within the second cavity 52. The direct engagement between the second ion trap 400 and the second cavity 52 of the insert 50 can allow accurate alignment of the second ion trap 400 and the insert 50.

In preferred embodiments, the electrically insulating spacers 430*a*, 430*b* form the mounting surfaces for the second ion trap 400, wherein at least one of the mounting surfaces is directly engaged with the insert 50. Preferably at least one, more preferably both, mounting surfaces slide into engagement with the insert 50.

Thus, the insert 50 provides a unitary alignment member by which the first ion trap 200 is aligned with the second ion trap, such that a continuous path for ions from an aperture 220 of the first ion trap 200, via a lens stack path through the lens stack 300, to an injection channel 460 in the second ion trap 400, can be aligned with very high accuracy. Further lenses could be used within and near the injection channel 460 as known in the art.

In preferred embodiments, the insert 50 is configured such that when inserted within the housing 10 it defines a plurality of separate regions 4, 6, 8, wherein the regions are sealed from one another.

Optionally, the unitary insert 50 may extend to define a further separate region 2. Alternatively, as shown in FIG. 3, separate region 2 may be defined by a membrane component 60, which extends over the insert 50 to enclose the insert 50 within the housing 10.

The membrane component 60 may be formed of a conductive material, preferably metal, such as aluminium or stainless steel. The membrane component 60 may form a seal (preferably, as shown, a face seal) with the housing 10 to define a region 4. The membrane component may also seal with an element of the lens assembly 300, such as the first grounded lens 500*a*, as shown in FIG. 3.

Preferably, within the housing 10, there is defined: a first ion trap region 2 containing the first ion trap; a lens stack region 4 containing the lens stack; and a second ion trap region 8 containing the second ion trap.

An aperture in the insert 50, through which the lens stack 300 is inserted may be closed by forming a seal by contact between the insert 50 and a pair of electrodes 320*a*, 320*b* of the lens stack 300.

The first ion trap region 2 is evacuated to a first pressure; the lens stack region 4 is evacuated to a second pressure; and the second ion trap region 8 is evacuated to a third pressure. Preferably, the first pressure is greater than the second pressure and the second pressure is greater than the third pressure. Furthermore, the pressure within the first ion trap cavity 210 is higher than the first pressure.

By way of example, preferably, in the first embodiment, the pressure within the first ion trap cavity 210 is approximately $1*10^{-3}$ mbar, the first pressure is approximately $1*10^{-5}$ mbar, the second pressure is approximately $1*10^{-7}$ mbar, and the third pressure is approximately $1*10^{-10}$ mbar. Optionally, a further region 6 may be provided between the lens stack region 4 and the second ion trap region 8, having a pressure of approximately $1*10^{-5}$ mbar.

For each of the plurality of seals a higher pressure is applied to one side and a lower pressure is applied to the opposing side. Preferably, the ratio between the higher pressure and the lower pressure is less than 1000. Typically, this will be at least 100. In other words, the ratio between the higher pressure and the lower pressure is less than three orders of magnitude (as in the example above) and preferably at least two.

One or more seals between separate regions may be effected by contact between the insert 50 and the housing 10. Preferably, the housing 10 comprises a plurality of shoulders 12*a*, 12*b*, which define a continuous path around the insert 50. A shoulder 12*a*, 12*b* is defined by a pair of surfaces of the housing 10 that extend at an angle to one another. A respective corresponding portion of the insert 50 is arranged to interfit with each shoulder 12*a*, 12*b*.

Preferably, the insert 50 comprises a plurality of sealing flanges 54*a*, 54*b* extending outwardly therefrom for engagement with the shoulders 12*a*, 12*b* of the housing 10.

For example, the sealing flanges 54*a*, 54*b* may extend perpendicular to a longitudinal axis of the insert 50.

So that the insert 50 can be inserted into the housing without obstruction, but with guidance of the shoulders 12*a*, 12*b*, the sealing flanges 54*a*, 54*b* may extend from the insert by an amount that monotonically increases for neighbouring sealing flanges 54*a*, 54*b* towards the first ion trap 200. That is, the sealing flange 54*b* that is inserted the greatest distance into the housing 10 has a smaller span/width, than the sealing flange 54*a* that is inserted less far. For example, when the cross-section of the insert 50 is circular, the span/width would be the diameter perpendicular to the longitudinal axis X of the insert.

In some embodiments, sealing components/materials may be interposed between the shoulders 12*a*, 12*b* and the sealing flanges 54*a*, 54*b*. However, in other embodiments, one or more sealing flanges 54*a*, 54*b* may form a seal by direct contact with the shoulders 12*a*, 12*b* of the housing 10, as will be explained further below. Such direct contact may involve an interference fit between the one or more sealing flanges 54*a*, 54*b* and the shoulders 12*a*, 12*b* of the housing 10.

A fit, in particular an interference fit, can therefore be formed between neighbouring separate regions 4, 6, 8 by engagement between a shoulder 12*a*, 12*b* of the housing 10 and a sealing flange 54*a*, 54*b* that separates the neighbouring regions 4, 6, 8 by a labyrinthine seal.

As is known in the art, in order to achieve an ultra high vacuum, it is useful to be able to heat the chamber to a high temperature (known in the art as "bakeout"), principally for the removal of adsorbed water and impurities in any chamber.

This may be carried out using a heating/vacuum assembly comprising both a heating element and a vacuum pump. The heating/vacuum assembly may be mounted to the housing 10 and/or the insert 50.

Figure 4:
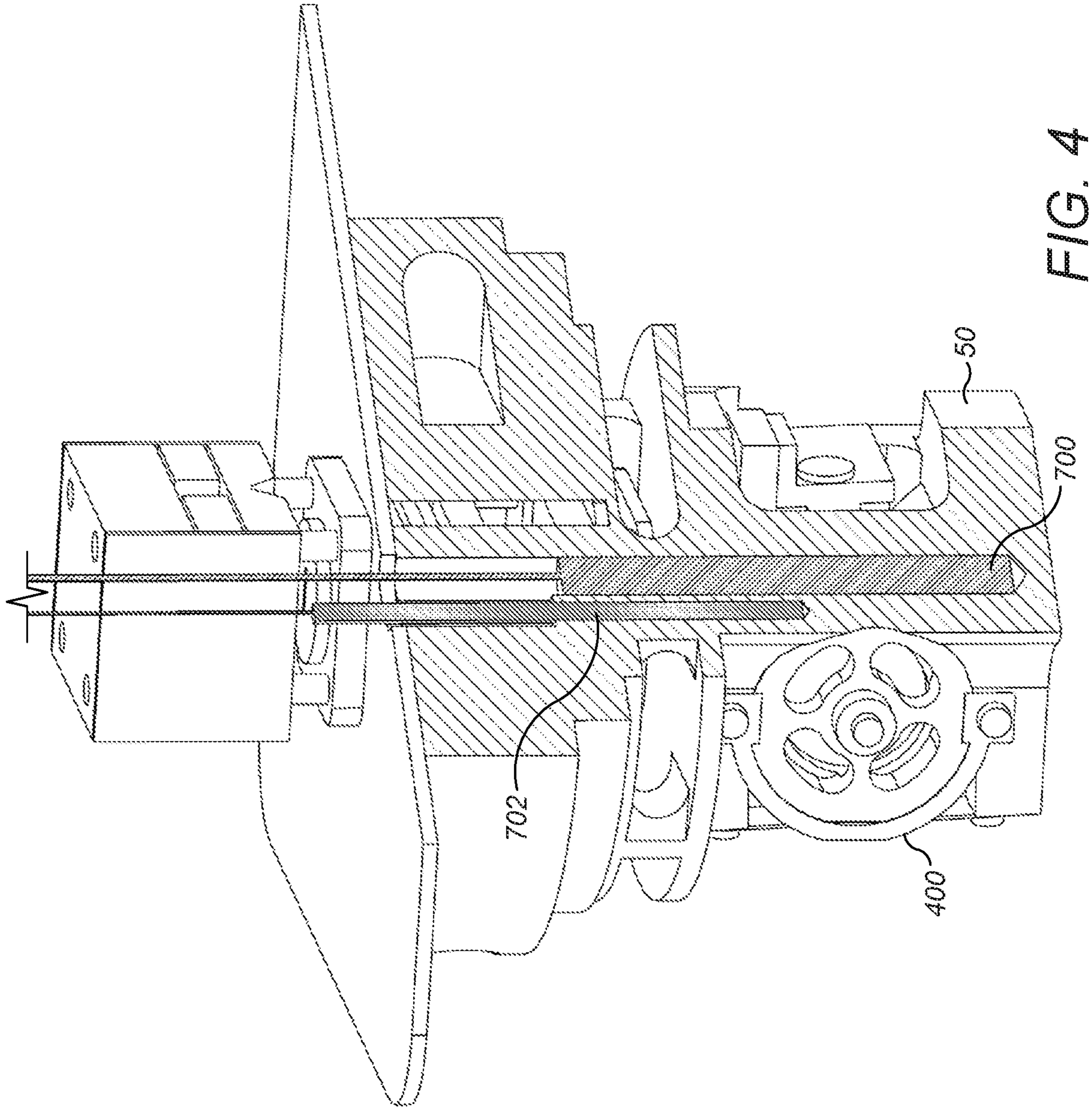
FIG. 4 shows an optional heater arrangement.

In the preferred embodiment of FIG. 4, there can be seen an optional heater arrangement 700. The heater arrangement 700 may be used instead of a heater in a heating/vacuum assembly, or as an extra heater. This heater can be used for bakeout of the high-vacuum regions or for thermal stabilization of the second ion trap 400, which can provide higher mass accuracy in changing environment.

The heater arrangement 700 is inserted in a bore within the insert 50. Preferably, the bore extends from the side of pressure region 2.

Preferably, a first heat sensor 702 (e.g. a thermocouple or a platinum resistor) is also inserted into a bore in the insert 50 (either the same bore, or a further bore).

More preferably, a second heat sensor (not shown) is also provided in the insert 50, spaced apart from the first heat sensor. The second heat sensor may be located closer to the first ion trap 200 than the first heat sensor 702.

Alternatively, the second heat sensor may be located closer to the bottom of insert 50 than the first heat sensor 702. This can enable temperature gradients over the insert 50 to be accurately assessed and corrected for during a calibration process.

In embodiments in which the insert 50 is thermally conductive, the first and second ion traps 200, 400 will not be thermally isolated. The provision of two heat sensors in the manner suggested above can be used for calibration and/or numerical compensation for readings from the first and second ion traps 200, 400.

Figure 5:
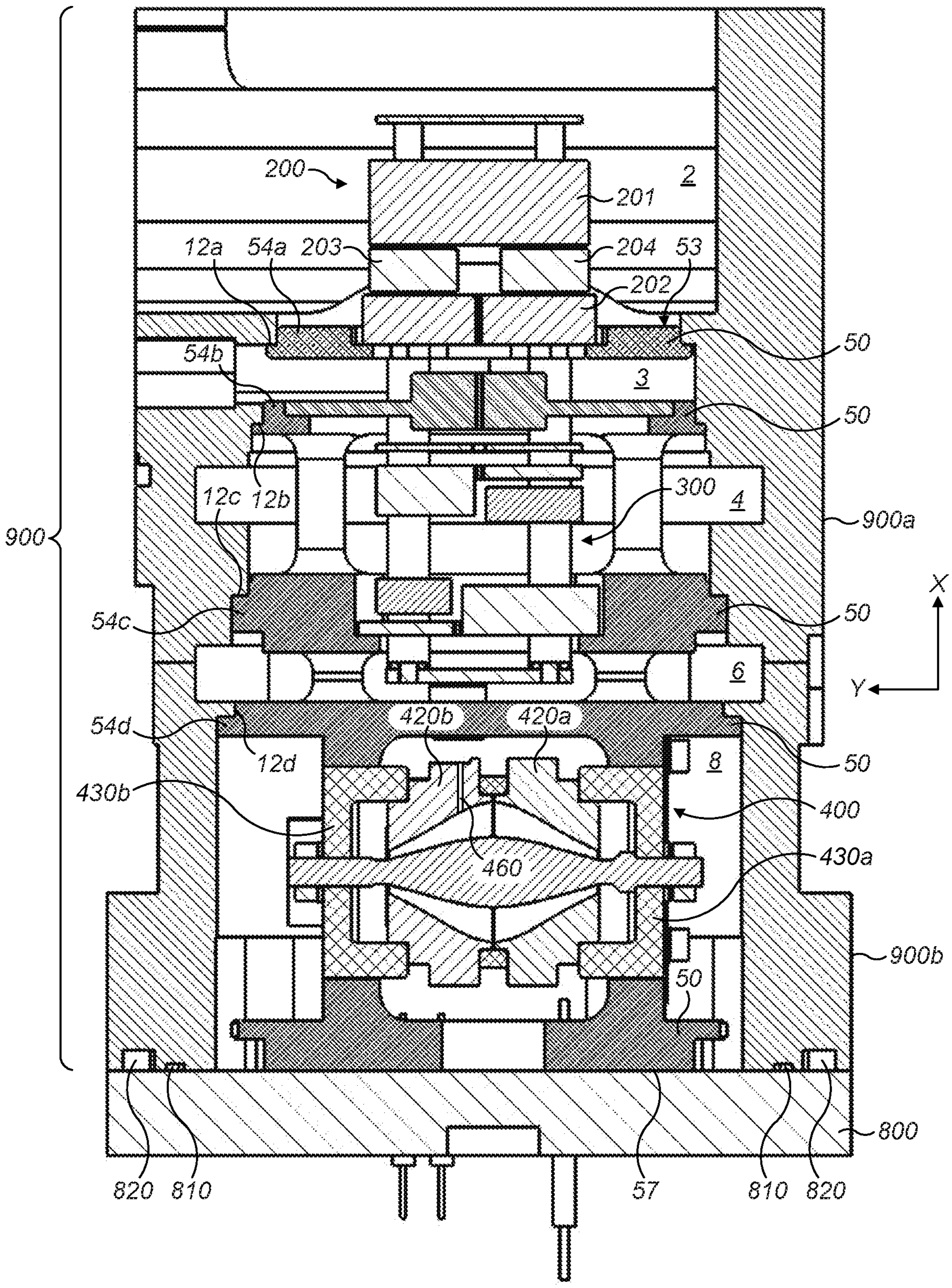
FIG. 5 shows a cross-section of a second embodiment.

A second embodiment is shown in FIG. 5. The difference between the second embodiment of FIG. 5 and the first embodiment of FIG. 3 is the arrangement of flanges 54*a*, 54*b*, 54*c*, 54*d* and shoulders 12*a*, 12*b*, 12*c*, 12*d*.

In FIG. 3, the flanges gradually increase in span/width towards the first ion trap 200, whereas in FIG. 5, the flanges gradually decrease in span/width towards the first ion trap 200. This is because, in the first embodiment, the second end 57 of the insert 50 (that which holds the second ion trap 400) is to be inserted first into the housing 10. By way of example, when the cross-section of the insert 50 is circular, the span/width would be the diameter perpendicular to the longitudinal axis X of the insert.

In general, housing 10 may be directly mounted (for example, bolted) onto a pump such as a turbomolecular pump (preferably a multi-stage turbomolecular pump), for example, as described in US2015056060. In particular the housing 10 may provide ports to the pump.

In the second embodiment, the first end 53 of the insert 50 (that which holds the first ion trap 200) is to be inserted first into the housing 10. In this embodiment, housing 10 may provide ports to the pump.

In the second embodiment, the second end 57 of the insert 50 (the end that holds the second ion trap 400) is arranged to abut against a vacuum flange 800 mounted on the housing 10. Alternatively the insert 50 can be mounted on the vacuum flange 800 and then the assembly of insert 50 and vacuum flange 800 is inserted into the housing 10. Preferably the vacuum flange 800 is connected by bolts with the housing 10. Preferably, the vacuum flange 800 includes a heater for effecting bakeout inserted from the atmospheric side. To avoid leaks from atmosphere into region 8, sealing by viton O-ring 820 is enhanced by pumping an additional groove 810 being connected with the vacuum region 3 or 4 using the differential pumping effect.

In either embodiment, the symmetrical arrangement of the trap 400 support can ensure equal capacitance to ground and therefore reduced electrical noise pickup. Also, mechanical stress on the trap 400 is greatly reduced and this reduces detrimental effects of vibration (i.e. noise peaks and side-bands) originating from one or more vacuum pumps used to evacuate mass spectrometer.

It is preferable to decouple thermal expansion of insert 50 from thermal expansion of trap 400. In some embodiments, therefore, insulating spacers 430 are slidable relative to insert 50.

This may be achieved by providing a high tolerance finish of the contacting surfaces of both the holding end 57 and the insulating spacers 430.

Alternatively, this may be achieved by clamping second ion trap 400 at one end and supporting it by a flexible member at the other end.

As another alternative, the insert end 57 may be manufactured from the same material as the second ion trap 400.

In the embodiments set out above, it is preferred that at least one seal between the first ion trap and the second ion trap is a contact seal, i.e. a seal formed by pressure between directly contacting surfaces of an insert 50 and a housing 10. Preferably, a plurality of contact seals are formed by the engagement of the plurality of sealing flanges 54*a*, 54*b* with the shoulders 12*a*, 12*b* of the housing 10.

In preferred embodiments, the housing 10 and insert 50 are conductive and preferably both metal (in which case, a seal between the first ion trap and the second ion trap would be considered a "metal-to-metal seal" (whether this be a shaft-to-hole or face-to-face seal, i.e. via radial or axial interference).

Unlike traditional knife-edge seals (like Conflat®), metal deformation is preferably kept below the threshold of plastic deformation so that any deformation is in the elastic range. This allows multiple disengagements and re-engagements of parts without sacrificing quality of vacuum.

In preferred embodiments, any seals below $1*10^{-7}$ mbar are metal-to-metal face seals. So a bake-able system is provided in the low pressure regions of a mass spectrometer or a part of the mass spectrometer.

The use of metal-to-metal seals can provides a conductive path between the insert 50 and housing 10, such that they collectively define a first conductive enclosure for the first ion trap 200 and a second conductive enclosure for the second ion trap 400. The two conductive enclosures therefore shield the ion traps 200, 400 from one another, preventing electromagnetic interference.

In embodiments without direct contact between directly contacting surfaces of the insert 50 and the housing 10, it is possible to use a conductive seal.

A mass spectrometer in accordance with the invention may be formed by a method comprising: forming an insert 50 with a first cavity and a second cavity, the insert being complementary to the housing 10.

The lens stack 300 is inserted into the first cavity.

The second ion trap 400 is inserted into the second cavity (either before, after, or simultaneously with, the insertion of the lens stack 300 into the first cavity).

The resulting assembly of insert 50, lens stack 300, and second ion trap 400 is then inserted into the housing 10.

The seals may be formed by the insertion of the insert 50 into the housing 10.

Whereas it is only shown in FIG. 5, the insert 50 can directly contact and engage the first ion trap 200. FIG. 5 shows that this may be achieved via the flanges 54*a*.

A third embodiment is shown in FIGS. 6 to 13.

Figure 6:
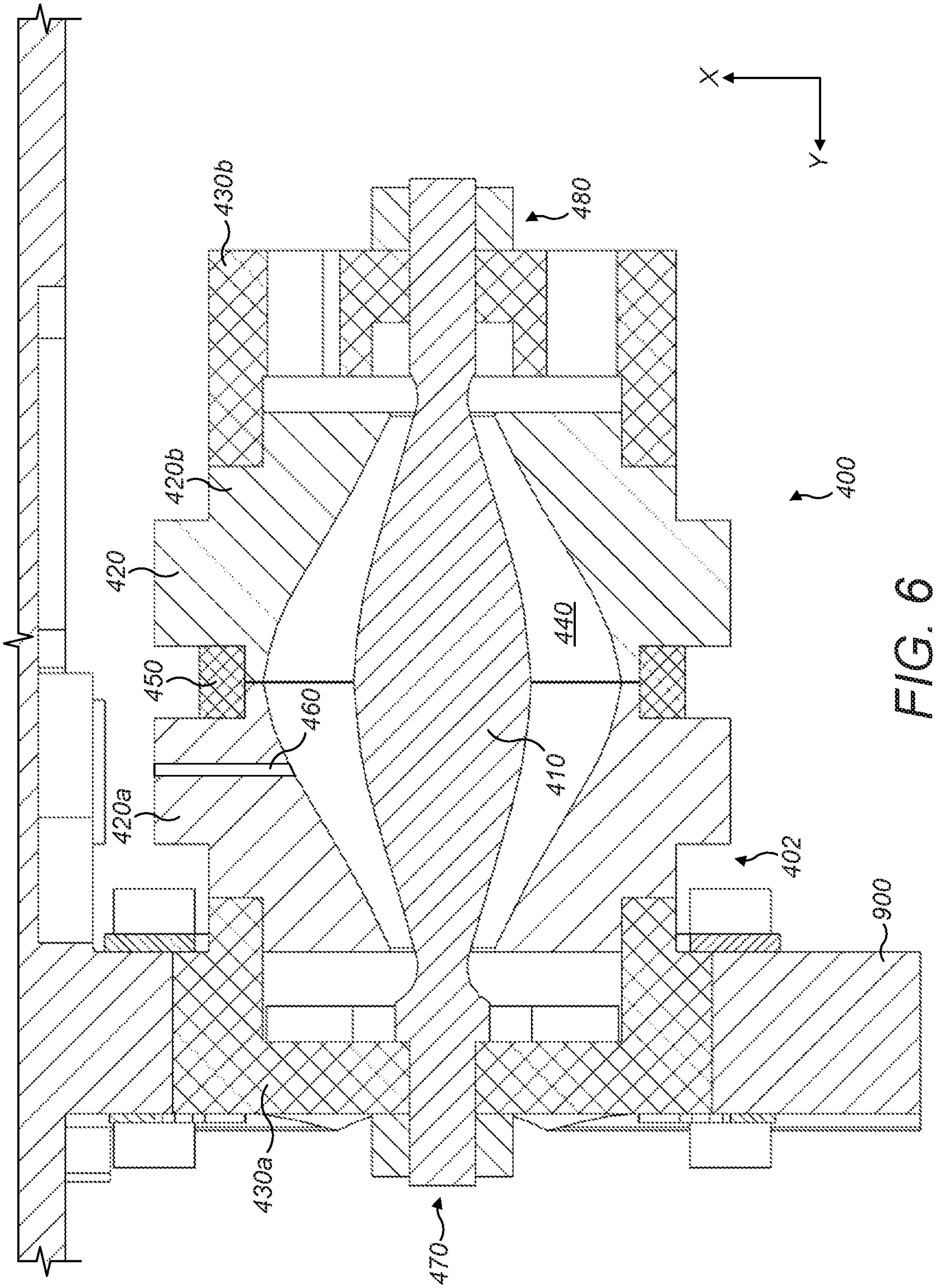
FIG. 6 shows a cross-section of an electrostatic ion trap mounted to a support structure for forming a portion of a mass spectrometer in accordance with a third embodiment.
Figure 7:
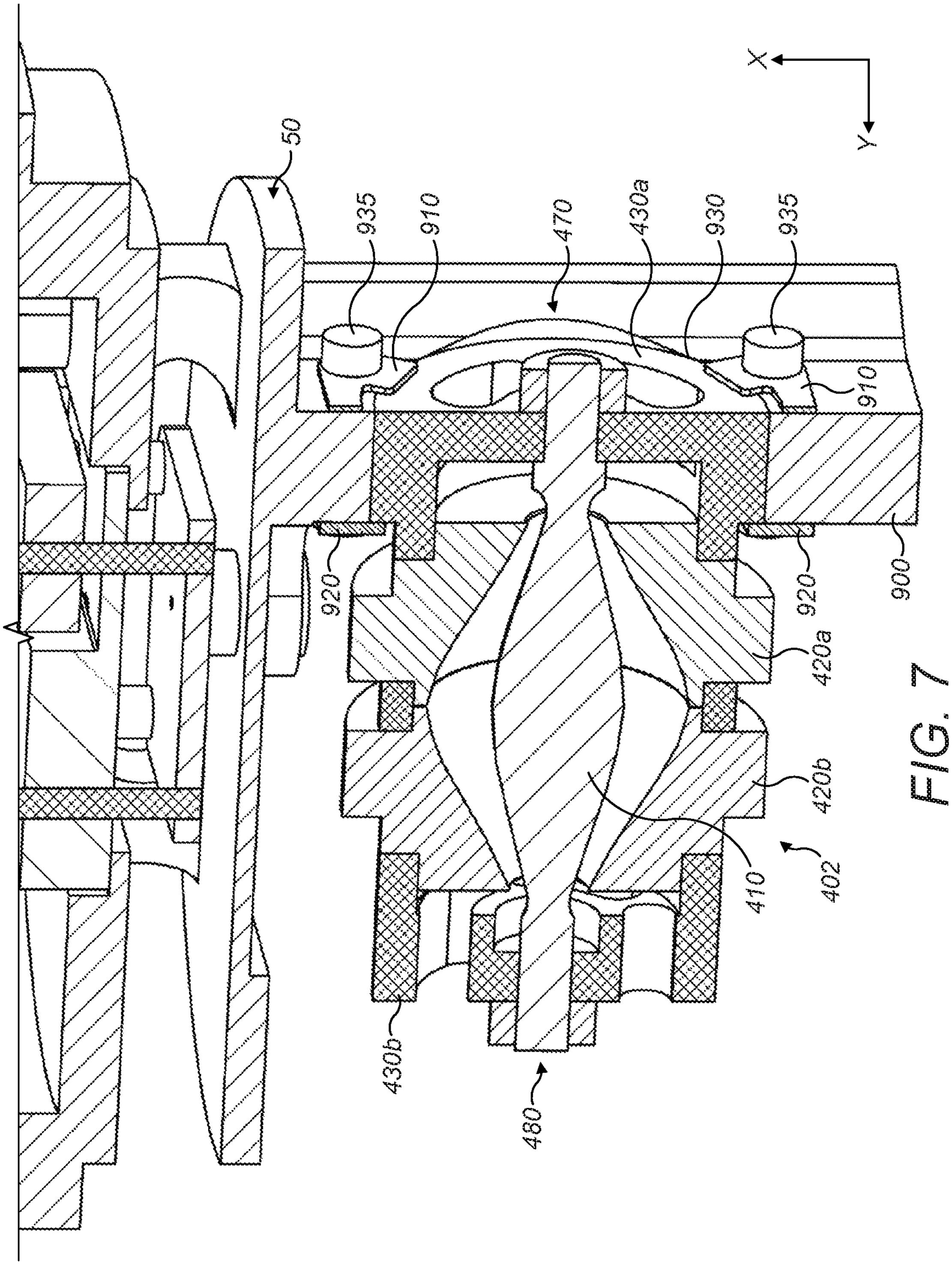
FIG. 7 is a perspective view of the electrostatic ion trap and the support structure of FIG. 6.

FIG. 6 shows a cross-section of an electrostatic ion trap 400 and FIG. 7 shows a perspective view of the electrostatic ion trap 400 showing a cross-section of the ion trap along a XY-plane, which does not comprises the central longitudinal axis of the spindle electrode 410. The electrostatic ion trap 400 is the same as the second ion trap 400 of FIGS. 2 to 5. Accordingly, the electrostatic ion trap 400 comprises a spindle electrode 410 surrounded by an outer electrode 420. The outer electrode 420 may comprise, and preferably consist of, one or more (in this example, two) barrel electrodes 420*a* and 420*b*. The barrel electrode(s) 420*a*, 420*b* may be separated by an insulating ring 450. The spindle electrode 410 and barrel electrodes 420*a* and 420*b* collectively define a cavity 440. Thus, the electrostatic ion trap 400 is preferably an orbital ion trap of an Orbitrap type.

The electrostatic ion trap 400 has a central longitudinal axis defined by the spindle electrode 410. The barrel electrodes 420*a*, 420*b* and spindle electrode 410 extend along the longitudinal axis. A first end 470 and a second end 480 of the electrostatic ion trap 400 are offset from each other along the longitudinal axis of the ion trap 400.

The electrodes of the electrostatic ion trap 400 (spindle electrode 410 and barrel electrodes 420*a*, 420*b*) form the electrode assembly 402 of the electrostatic ion trap 400. The electrostatic ion trap 400 further comprises first and second insulating spacers 430*a*, 430*b* positioned at the first end 470 and the second end 480 of the electrostatic ion trap 400, respectively. The two barrel electrodes 420*a*, 420*b* are separated from the spindle electrode 410 by the first and second insulating spacers 430*a*, 430*b*. The first and second insulating spacers 430*a*, 430*b* are electrically insulating.

The electrostatic ion trap 400 is arranged to form an annular potential well in the cavity 440.

As is known in the art, the electrostatic ion trap 400 will comprise a schematically shown ion introduction channel 460 in the barrel electrode 420*b* for the injection of ions into the cavity 440. Such a configuration is known in the art, for example from WO2012152950A1 or U.S. Pat. No. 7,714,283.

Figure 8:
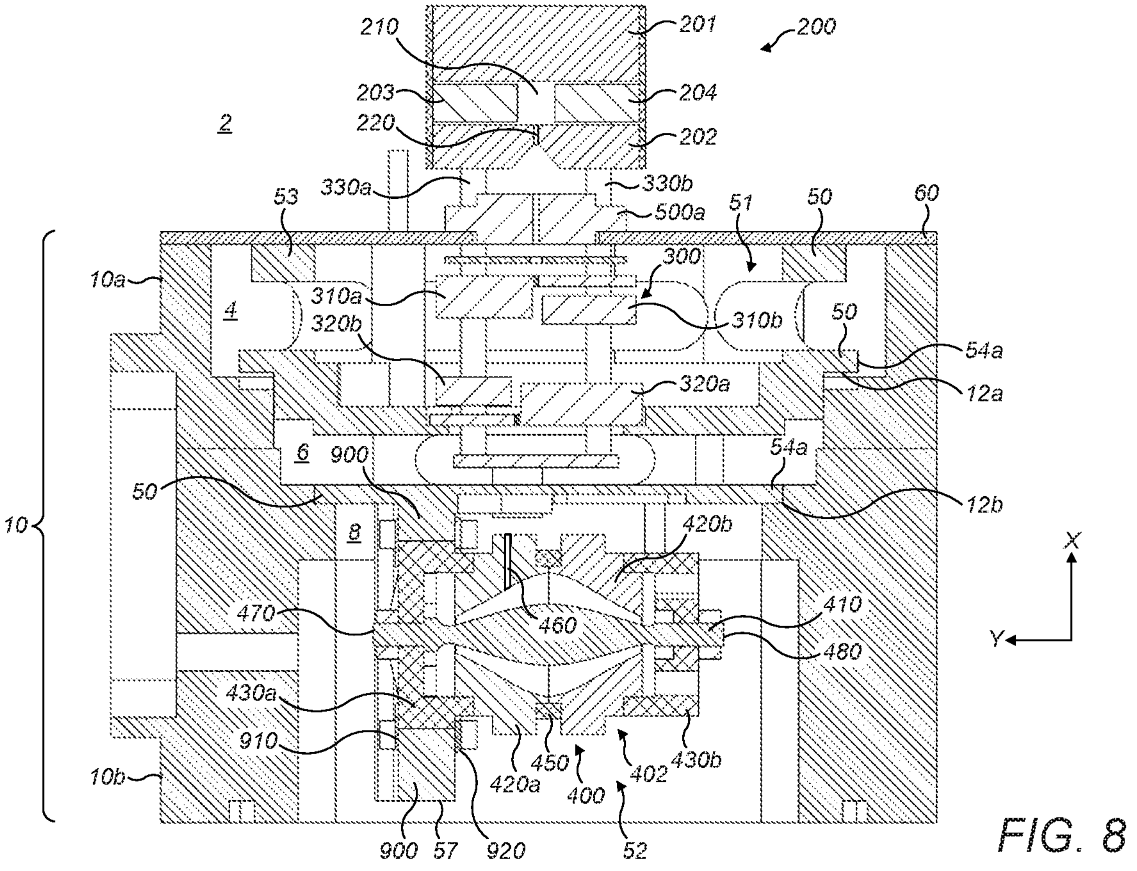
FIG. 8 shows a cross-section of an assembly of the components of FIGS. 1 and 6 for forming a portion of a mass spectrometer in accordance with the third embodiment.

As shown in FIGS. 6 to 8, the third embodiment further comprises a support structure 900. In the third embodiment, the support structure 900 forms part of the insert 50, which has been described in detail above in respect of the first and second embodiments and is shown in FIGS. 3 to 5. However, it is possible for the support structure 900 to instead form part of the housing 10 of the mass spectrometer, which is also described in detail above in respect of the first and second embodiments. For example, the support structure 900 may be an arm of the housing 10.

The difference between the third embodiment shown in FIGS. 6 to 8 and the first and second embodiments shown in FIGS. 2 to 5 is the different mounting arrangements for the electrostatic ion trap 400. In FIGS. 6 to 8, the electrostatic ion trap 400 is mounted to the support structure 900 only at its first end 470 and the second end 480 is free. By "free" it is meant that the second end 480 is not mounted to the support structure 900. Indeed, the second end 480 is mechanically decoupled from the support structure 900. In contrast, in FIGS. 2 to 5, the second ion trap 400 is mounted at both ends to insert 50. In contrast, in FIGS. 2 to 5, the second ion trap 400 is mounted at both ends to insert 50.

If an ion trap mounted in a cavity at both ends with one end fixed in place and the other end mounted using a sliding bearing and the mounting surfaces of the ion trap and/or the mounting surfaces of the cavity are not well polished, then stiction can occur with temperature change due to differing thermal expansion. Forces may then be exerted on the barrel electrode(s) 420*a*, 420*b* and consequently signal drift may be observed in the mass spectra. This drift would require additional calibration of the mass spectrometer.

The third embodiment shown in FIGS. 6 and 7 is advantageous, since by mounting the electrostatic ion trap 400 only at one end, stiction and consequent signal drift is reduced. Although the electrostatic ion trap 400 and the support structure 900 may still experience differing thermal expansion with temperature changes, their thermal expansion is unconstrained along the longitudinal axis in the direction towards the second end 480 of the electrostatic ion trap 400. This is because the second end 480 is free. Accordingly, forces are not exerted on the barrel electrode(s) 420*a*, 420*b* by the support structure 900 and signal drift in the resulting mass spectra avoided.

As best shown in FIGS. 6 and 7, the first electrically insulating spacer 430*a*, which is positioned at the first end 470 of the electrostatic ion trap 400, forms a mounting surface for the electrostatic ion trap 400 and is directly engaged with the support structure 900. By direct engagement it is meant that a surface of one component contacts a surface of another component. Typically, the electrically insulating spacer 430*a* is mounted to the support structure 900 by a clamping mechanism e.g. using nuts and bolts.

The inner surface of the first electrically insulating spacer 430*a* is proximal to the electrode assembly 402 of the electrostatic ion trap 400. The outer surface of the first electrically insulating spacer 430*a* is distal from the electrode assembly 402 of the electrostatic ion trap 400. The inner surface is parallel to and opposite the outer surface. The longitudinal axis of the electrostatic ion trap 400 is normal to the inner and outer surfaces of the first electrically insulating spacer 430*a*.

Instead of relying on a sliding action of a sliding bearing which can suffer from stiction unless the mounting surfaces are highly polished, in this embodiment, as best shown in FIG. 7, the support structure 900 preferably comprises one or more biasing arrangement(s) 910 directly engaged with the outer surface of the first electrically insulating spacer 430*a* and one or more hardstop plates 920 directly engaged with the inner surface of the electrically insulating spacer 430*a*. Screws 935 can be used to directly engage the hardstop plates 920 with the electrically insulating spacer 430*a* and to directly engage the biasing arrangement(s) 910 with the electrically insulating spacer 430*a*. The one or more biasing arrangement(s) 910 and one or more hardstop plates 920 are employed to mount the electrostatic ion trap 400 to the support structure 900 such that the thermal expansion of the support structure 900 is at least partially decoupled from the thermal expansion of the electrostatic ion trap 400. The biasing arrangement 910 is more flexible than the hardstop plates 920. Preferably, the biasing arrangement 910 is more flexible than the hardstop plates 920 by a factor of 10. Indeed, the hardstop plates 920 are typically formed of a rigid material and the biasing arrangement 910 is typically formed of a material capable of elastic deformation. Preferably the hardstop plates are made of Cr—Ni steel being an austerite or an stainless steel. Preferably the biasing arrangements 910 are made of spring steel, which is preferably an Ni—Cr alloy or a Co—Ni—Cr multiphase alloy. Preferably the spring steel has been exposed to a hardening process or is hard rolled. The biasing arrangement 910 are arranged such that they exert an elastic (biasing) force, preferably a spring force, in the longitudinal direction on the hardstop plates 920. The biasing arrangement 910 enables thermal expansion of the support structure 900 and/or first electrically insulating spacer 430*a* along the longitudinal axis of the ion trap 400 in the direction away from the electrode assembly 402 of the electrostatic ion trap 400. The hardstop plates 920 prevent expansion of the support structure 900 and/or first electrically insulating spacer 430*a* along the longitudinal axis in the direction towards the electrode assembly 402 of the electrostatic ion trap 400. Therefore, forces on the barrel electrode(s) 420*a*, 420*b* and consequent signal drift in mass spectra are avoided. Furthermore, the contacting surfaces of the electrically insulating spacers 430*a*, 430*b* and the contacting surfaces of the support structure 900 do not need to be highly polished. Preferably, each biasing arrangement 910 is positioned opposite each hardstop plate 920. Preferably, the one or more biasing arrangement(s) 910 are one or more spring plates 910. More preferably, the support structure comprises first and second hardstop plates 920 and first and second spring plates 910. Preferably, the first hardstop plate 910 is diametrically opposite the second hardstop plate 920 and the first spring plate 910 is diametrically opposite the second spring plate 910.

The first electrically insulating spacer is retained within a first bore 930 formed in the support structure 900. As discussed above, the first bore 930 does not need to be highly polished. Preferably, the diameter of the first electrically insulating spacer 430*a* is approximately the same as the diameter of the first bore 930 thereby reducing stiction. Typically, the diameter of the first electrically insulating spacer 430*a* and the diameter of the first bore is between 10 mm and 60 mm, preferably between 20 mm and 40 mm and more preferably between 25 mm and 35 mm. Preferably, the one or more hardstop plates 920 and one or more biasing arrangement(s) 910 are positioned proximal to the periphery of the first bore 930.

Preferably, the first electrically insulating spacer 430*a* is formed of fused silica. Fused silica has a reduced hardness and compressive strength compared to the materials typically used in known insulating spacers, such as ceramics. By forming the first insulating spacer 430*a* of fused silica, forces applied to the first insulating spacer 430*a* by the biasing arrangement(s) 910 are not transmitted to the barrel electrode(s) 420*a*, 420*b* via the first electrically insulating spacer 430*a*. Preferably, the second electrically insulating spacer 430*b* is also formed of fused silica. Additionally fused silica has a relatively low dielectric constant resulting in reduced dielectric losses compared to the materials typically used in electrically insulating spacers.

FIG. 8 shows a cross-section of an assembly of the components of FIGS. 1 and 6 for forming a portion of mass spectrometer in accordance with the third embodiment. The difference between the third embodiment shown in FIG. 8 and the first embodiment shown in FIG. 3 is that the electrostatic ion trap 400 is only mounted at one end, as discussed above. The description of the other components of FIG. 3 equally apply to the equivalent components of FIG. 8, which are labelled with the same reference numerals.

Figure 9:
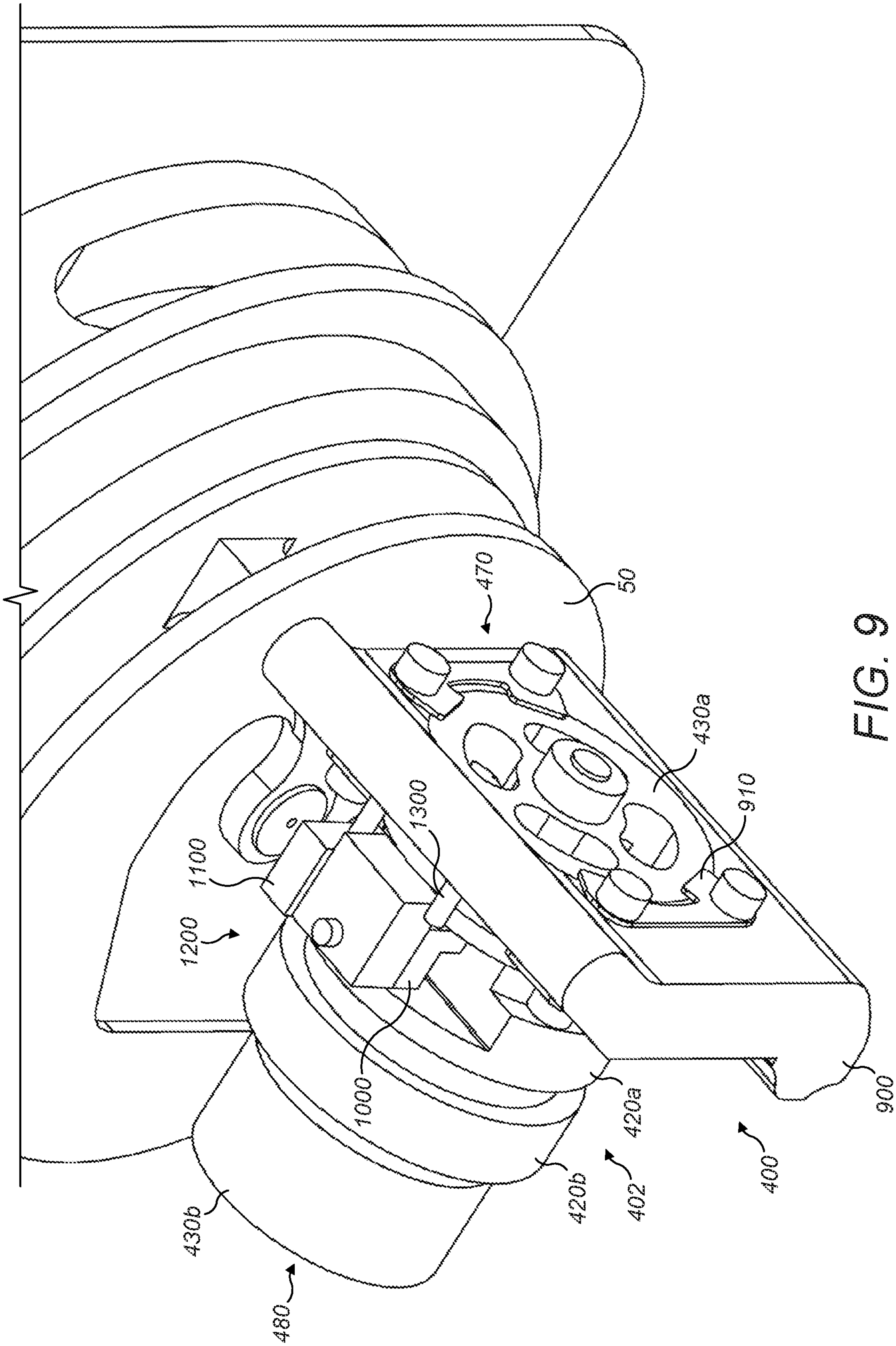
FIG. 9 shows a perspective view of an assembly for forming a portion of a mass spectrometer in accordance with the third embodiment, the assembly comprises the components of FIG. 6 and optionally also comprises a deflector and a focussing lens mounted to the electrostatic ion trap.
Figure 10:
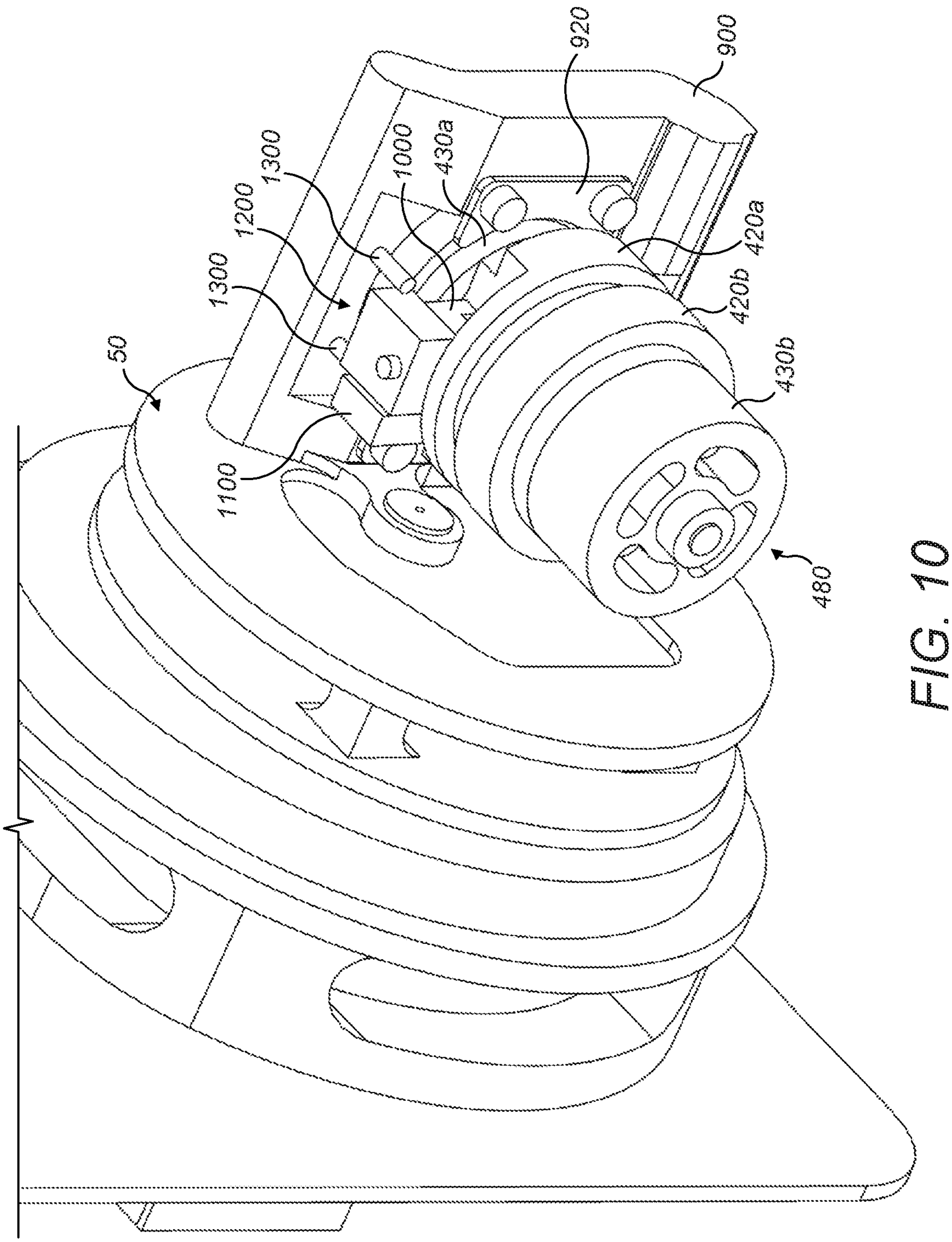
FIG. 10 is a further perspective view of the assembly of FIG. 9.

In the preferred embodiment shown in FIGS. 9 and 10 the assembly further comprises a deflector 1000 and a focussing lens 1100 for directing ions into the electrostatic ion trap 400. Deflectors are well known in the art, for example, from WO2012152950A1 and U.S. Pat. No. 7,714,283. The deflector 1000 and the focussing lens 1100 are directly mounted on the electrostatic ion trap 400. By direct mounting is meant that a surface of one component contacts a surface of another component. Typically, the deflector 1000 and focussing lens 1100 are secured to the electrostatic ion trap 400 using nuts and bolts. By directly mounting the deflector 1000 and the focussing lens 1100 on the electrostatic ion trap 400 rather than to the supporting structure 900, the deflector 1000 and the focussing lens 1100 are mechanically decoupled from the supporting structure 900. Accordingly, forces from the supporting structure 900, which result e.g. from the differing thermal expansion of the electrostatic ion trap 400 and the supporting structure 900, will not be transmitted via the deflector 1000 or focussing lens 1100 to the barrel electrode(s) 420*a*, 420*b*. Consequently, signal drift in the resulting mass spectra is avoided. Whilst the arrangement of FIG. 9 shows both the deflector 1000 and the focussing lens 1100 directly mounted on the electrostatic ion trap 400, it will be appreciated that only one of the deflector 1000 and the focussing lens 1100 may be directly mounted on electrostatic ion trap 400. It will also be appreciated that the assembly may comprise only one of the deflector 1000 and the focussing lens 1100.

As best shown in FIG. 10, the deflector 1000 and the focussing lens 1100 are directly mounted on the barrel electrode 420*a* in which the introduction channel 460 is formed.

Typically, the deflector 1000 and focussing lens 1100 are directly mounted on the outer surface of the barrel electrode 420*a*.

Preferably the deflector 1000 and/or the focussing lens 1100 are positioned on the outer surface of the barrel electrode 420*b*. More preferably, the deflector 1000 and/or the focussing lens 1100 are retained in position by abutting against a protrusion formed on the outer surface of the barrel electrode 420*b*.

The deflector 1000 is typically positioned perpendicular to the longitudinal axis of the ion introduction channel 460. The deflector 1000 is positioned such that on application of a voltage to the deflector 1000, a tangential force is applied to the ions entering the cavity 440 via the ion introduction channel 460. The tangential force guides the ions exiting the ion introduction channel 460 towards the centre of the cavity 440. The focussing lens 1100 is preferably a high voltage (HV) focus lens.

The focussing lens 1100 is preferably positioned to guide ions into the ion introduction channel 460. Typically, the focussing lens 1100 is positioned directly in front of the ion introduction channel 460 such that the ions pass through the focussing lens 1100 to enter the ion introduction channel 460.

Preferably, the deflector 1000 and focussing lens 1100 are supported by a support member 1200. Preferably, the support member 1200 is a unitary support member comprising a first receiving portion for holding the deflector 1000 and a second receiving portion for holding the focussing lens 1100. Preferably, the support member 1200 holds the deflector 1000 in a fixed position relative to the focussing lens 1100.

Optionally, the embodiment of FIG. 10 further comprises guide members 1300 configured to restrict rotation of the spindle electrode 410 and/or the barrel electrodes 420*a*, 420*b* about the longitudinal axis of the electrostatic ion trap 400. More specifically, the guide members restrict rotation of the spindle electrode 410 and/or the barrel electrodes 420*a*, 420*b* relative to the support structure 900. Preferably, the guide members 1300 are elongate and extend parallel to the longitudinal axis of the electrostatic ion trap 400. Typically, the guide members 1300 are spaced apart from each other to define a gap therebetween. Preferably, the guide members 1300 are part of the support structure 900 and extend therefrom towards the electrode assembly 402 of the electrostatic ion trap 400. In another embodiment a guide member can be located in a separate pillar or recess, which can be part of an insert 50 or the housing 10. The guide members 1300 may abut a component of the electrostatic ion trap 400 or a component mounted to the electrostatic ion trap 400 to restrict rotation of the spindle electrode 410 and/or barrel electrode(s) 420*a*, 420*b*.

In a preferred embodiment, as best shown in FIG. 10, the guide members 1300 extend from the support structure 900 and are spaced apart such that the guide members 1300 abut opposite surfaces/edges of the support member 1200. This abutment restricts rotation of the barrel electrode 420*a* relative to the support structure 900. Typically, there is some play between the guide members 1300 and the surfaces/edges of the support member 1200 which abut the respective guide member 1300 on rotation of the barrel electrode 420*a*. Accordingly, some minimal rotation of the barrel electrode 420*a* is permitted before abutment. The clearance between the guide member 1300 and the surface of the support member 1200 which abuts the respective guide member 1300 on rotation of the barrel electrode 420*a* may be in a range of 50 μm to 200 μm, preferably in a range of 70 μm to 150 μm and more preferably in a range of 80 μm to 120 μm. Typically a maximum possible rotation of the barrel electrode 420*a* is in the range of 1° to 5°, preferably a maximum possible rotation of the barrel electrode 420*a* is in the range of 2° to 3° and more preferably a maximum possible rotation of the barrel electrode 420*a* is in the range of 2.25° to 2.75°. Accordingly, the size of the clearance can be varied to reduce or increase the permitted degree of rotation of the barrel electrode 420*a* relative to the support structure 900.

Alternatively, the guide members 1300 may be mounted to the electrostatic ion trap 400 or to a feature mounted on the electrostatic ion trap, such as the support member 1200, and extend therefrom in the longitudinal direction towards the support structure 900. The at least one guide member 1300 may abut the support structure 900 to restrict rotation of the spindle electrode 410 and/or barrel electrode(s) 420*a*, 420*b* relative to the support structure 900. For example, the guide members 1300 may be received in spaced apart grooves (not shown) in the support structure 900.

In general it is sufficient to provide at least one guide member 1300. Such at least one guide member 1300 can be used to restrict the rotation of the electrodes of any mass analyser having electrodes arranged along a longitudinal direction when the mass analyser is mounted in a support structure only at one of its ends along its longitudinal direction.

Figure 11:
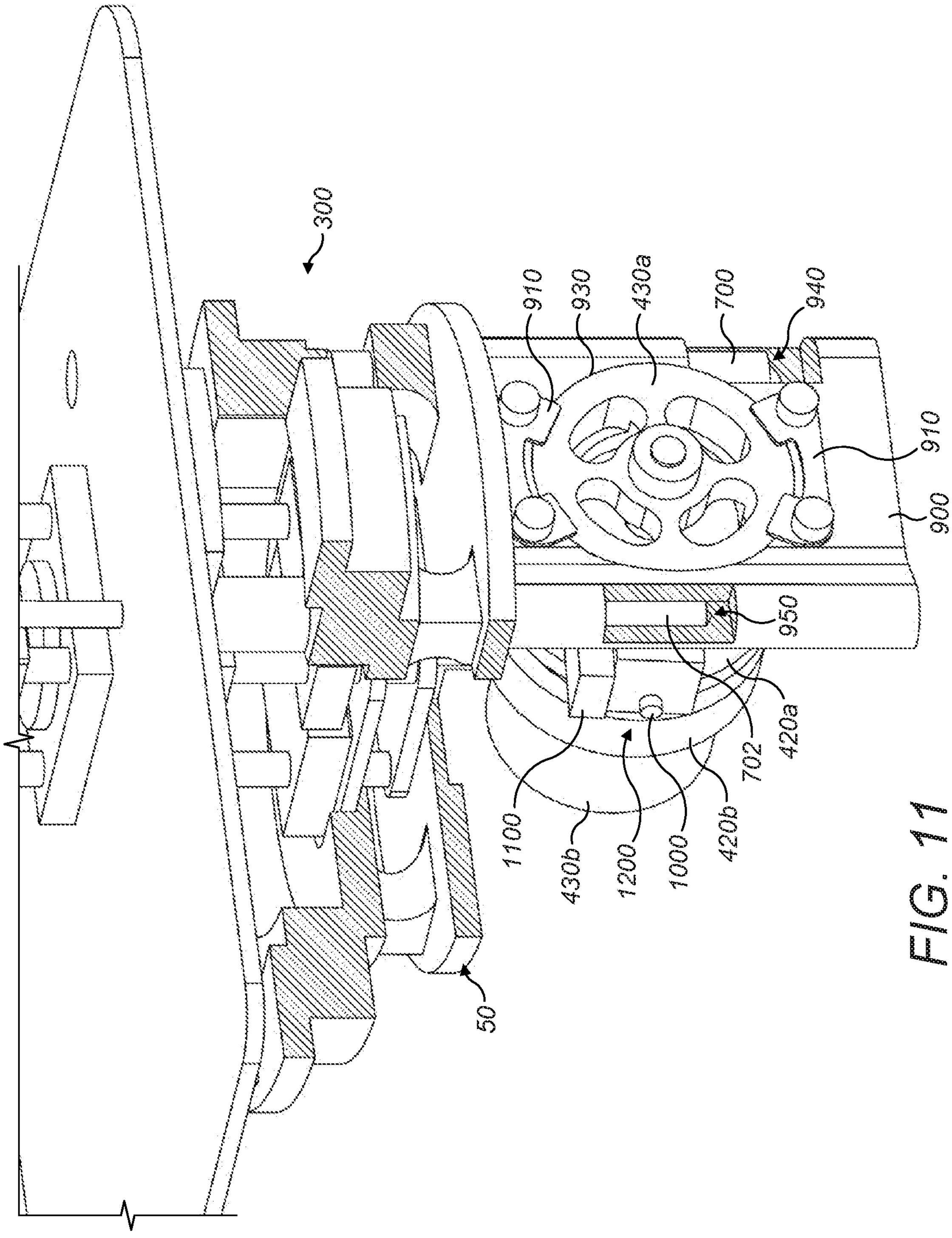
FIG. 11 is a perspective view of the lower part of the assembly of FIG. 8.

In the preferred embodiment of FIG. 11, similarly to the embodiment shown in FIG. 4, there can be seen an optional heater arrangement 700. The heater arrangement 700 may be used instead of a heater in a heating/vacuum assembly, or as an extra heater. This heater can be used for bakeout of the high-vacuum regions or for thermal stabilization of the electrostatic ion trap 400, which can provide higher mass accuracy in changing environment. The heater arrangement 700 may be a cartridge heater.

The heater arrangement 700 is inserted in a second bore 940 within the support structure 900. Preferably, a first heat sensor 702 (e.g. a thermocouple or a platinum resistor) is also inserted into a third bore 950 in the support structure 900. Alternatively, the first heat sensor is mounted in the same bore as the heater arrangement 700.

Optionally, a second heat sensor (not shown) may also provided in the support structure 900 or another part of the insert 50, spaced apart from the first heat sensor. The second heat sensor may be located closer to the first ion trap 200 than the first heat sensor 702.

Alternatively, the second heat sensor may be located closer to the bottom of the insert 50 than the first heat sensor 702. This can enable temperature gradients over the insert 50 to be accurately assessed and corrected for during a calibration process.

In embodiments in which the insert 50 (and support structure 900 forming part of the insert 50) is thermally conductive, the first ion trap 200 and electrostatic ion trap 400 will not be thermally isolated. The provision of two heat sensors in the manner suggested above can be used for calibration and/or numerical compensation for readings from the first ion trap 200 and the electrostatic ion trap 400.

Whilst the electrostatic ion trap 200 described in the third embodiment is an orbital ion trap, it will be appreciated that the features of third embodiment can equally be employed with different types of mass analysers extending along the longitudinal direction between a first end and a second end and having electrodes arranged along the longitudinal direction. Examples of such mass analysers are described in WO 2013/110587 A2 and WO 2007/122383 A2. In particular the features of the third embodiment can be equally employed with a different type of electrostatic ion traps, which may have a different shape.

The features described for a specific embodiment of the invention can be also used in another embodiment of the invention combining the features of different embodiments of the invention described in this specification. For example, whilst the deflector 1000 and focussing lens 1100 are described only in the third embodiment, it is appreciated that the deflector 1000 and focussing lens 1100 can be similarly used in the first and second embodiments. By way of further example, the arrangement for mounting the electrostatic ion trap 400 only at one end described in the third embodiment can equally be applied to the first and second embodiments for mounting the second ion trap 400 to the insert 50 at one end instead of at both ends.

The invention claimed is:

1. A mass spectrometer, comprising:

a housing; and a removable assembly, wherein the removable assembly is inserted within the housing; wherein the removable assembly comprises:

a first ion trap, the first ion trap being arranged to form a linear or curved potential well;

a second ion trap, the second ion trap being an electrostatic ion trap implementing an orbital ion trap, arranged to form an annular potential well;

a lens stack for directing ions from the first ion trap to the second ion trap; and a unitary insert comprising a first cavity which holds the lens stack and a second cavity which holds the second ion trap, wherein the first cavity is offset from the second cavity along a longitudinal axis extending through the unitary insert and intersecting the first cavity and the second cavity;

wherein the removable assembly is configured such that the first ion trap is aligned with the second ion trap before the removable assembly is inserted within the housing by the lens stack being held in the first cavity and the second ion trap being held in the second cavity.

2. The mass spectrometer of claim 1, wherein:

the lens stack comprises a plurality of electrodes having a plurality of pairs of electrodes, mounted on one or more alignment rods;

the first ion trap directly engages at least one of the one or more alignment rods;

the unitary insert directly contacts and receives within the first cavity at least one of the plurality of pairs of electrodes; and the unitary insert directly contacts and receives within the second cavity the second ion trap.

3. The mass spectrometer of claim 2, wherein:

the second ion trap comprises a spindle electrode extending through an annular cavity of at least one barrel electrode, wherein the spindle electrode and barrel electrode(s) are separated by one or more electrically insulating spacers; and the unitary insert directly contacts and receives within the second cavity at least one of the one or more electrically insulating spacer.

4. The mass spectrometer of claim 3, wherein the second ion trap extends between a first end and a second end, and wherein the second ion trap is mounted to the removable unitary insert at the first end and the second end is free.

5. The mass spectrometer of claim 4, wherein the second ion trap comprises the electrically insulating spacer at its first end, wherein the electrically insulating spacer forms a mounting surface for the second ion trap and is directly engaged with the unitary insert.

6. The mass spectrometer of claim 5, wherein the unitary insert comprises one or more biasing arrangement(s) implementing spring plates, directly engaged with an outer surface of the first electrically insulating spacer and one or more hardstop plates directly engaged with an inner surface of the electrically insulating spacer, wherein the inner surface of the first electrically insulating spacer is proximal to the barrel electrodes and the outer surface of the first electrically insulating spacer is distal from the barrel electrodes.

7. The mass spectrometer of claim 1, wherein:

the lens stack comprises a plurality of electrodes having a plurality of pairs of electrodes, mounted on one or more alignment rods; and the unitary insert directly contacts and receives the first ion trap.

8. The mass spectrometer of claim 1, further comprising a heating element for generating heat within the unitary insert.

9. The mass spectrometer of claim 1, wherein the housing comprises a plurality of separate regions sealed from one another by a plurality of seals.

10. The mass spectrometer of claim 9, wherein:

a first ion trap region of the plurality of regions contains the first ion trap and is evacuated to a first pressure;

a lens stack region of the plurality of regions contains the lens stack and is evacuated to a second pressure;

a second ion trap region of the plurality of regions contains the second ion trap and is evacuated to a third pressure; and the first pressure is greater than the second pressure and the second pressure is greater than the third pressure.

11. The mass spectrometer of claim 10, wherein a cavity is formed within the first ion trap, the cavity having a pressure greater than the first pressure.

12. The mass spectrometer of claim 9, wherein a pressure ratio is maintained across each of the seals, and each pressure ratio is less than 1000:1 and greater than 10:1.

13. The mass spectrometer of claim 9, wherein each of the seals is formed by engagement between a shoulder of the housing and a seal so that the regions are separated by seals having two or more abutting surfaces, forming a labyrinthine seal.

14. The mass spectrometer of claim 1, wherein at least one seal between the first ion trap region and the second ion trap region is a conductive seal, wherein one seal partner is the housing.

15. The mass spectrometer of claim 1, wherein both the unitary insert and the housing are metal and the at least one seal is formed by metal-to-metal contact between the unitary insert and the housing.

16. The mass spectrometer of claim 10, wherein a first seal is provided between the first ion trap region and the lens stack region, and the pressure ratio across the first seal is less than 1000:1 and greater than 10:1.

17. The mass spectrometer of claim 10, wherein a pair of second seals is provided between the lens stack region and the second ion trap region, and the pressure ratio across each of the second seals is less than 1000:1 and greater than 10:1.

18. The mass spectrometer of claim 17, wherein:

the pair of second seals are formed by contact between the unitary insert and the housing; and a seal is formed by contact between the unitary insert and a pair of electrodes of the lens stack.

19. The mass spectrometer of claim 1, wherein the unitary insert further comprises a plurality of sealing flanges extending outwardly from the longitudinal axis for engagement with the housing.

20. The mass spectrometer of claim 1, wherein the housing is conductive and the first ion trap is sealed from the second ion trap by a conductive seal that directly contacts the housing, the direct contact enabling electrical conduction between the unitary insert and housing.

21. The mass spectrometer of claim 20, wherein the housing and the unitary insert are conductive and the first ion trap is sealed from the second ion trap by direct contact between a sealing flange of the unitary insert and the housing, the direct contact enabling electrical conduction between the unitary insert and housing.

22. The mass spectrometer of claim 1, further comprising two heat sensors mounted on or within the unitary insert.

23. The mass spectrometer of claim 1, wherein the mass spectrometer further comprises a deflector and/or focusing lens for directing ions into the electrostatic ion trap, wherein the deflector and/or focusing lens are directly mounted on the electrostatic ion trap.

24. The mass spectrometer of claim 23, wherein the deflector and/or focusing lens are directly mounted on one of the barrel electrodes.

25. A mass spectrometer comprising:

a support structure; and a mass analyzer comprising an electrode assembly, wherein (i) the mass analyzer extends between a first end and a second end along its longitudinal direction, and (ii) the mass analyzer is mounted to the support structure solely at the first end such that the second end and a majority length of a longitudinal axis of the mass analyzer are not mounted to the support structure so that thermal expansion of the mass analyzer along the longitudinal axis in the direction towards the second end is unconstrained.

26. The mass spectrometer of claim 25, wherein the mass analyzer is an electrostatic ion trap implementing an orbital ion trap, arranged to form an annular potential well.

27. The mass spectrometer of claim 26, wherein the electrostatic ion trap comprises a spindle electrode extending through an annular cavity of one or more barrel electrodes.

28. The mass spectrometer of claim 27, wherein the mass spectrometer further comprises guide members configured to abut the spindle electrode and one or more barrel electrodes to restrict rotation of the spindle and/or one or more barrel electrodes about their longitudinal axis.

29. The mass spectrometer of claim 26, wherein the mass spectrometer further comprises a deflector for directing ions into the electrostatic ion trap, wherein the deflector is directly mounted on the electrostatic ion trap and mechanically decoupled from the support structure.

30. The mass spectrometer of claim 29, wherein the deflector is directly mounted on one or more of the barrel electrodes, wherein the deflector is directly mounted on the barrel electrode in which an ion introduction channel for injecting ions into the annular cavity is formed.

31. The mass spectrometer of claim 26, wherein the electrostatic ion trap comprises a focusing lens directly mounted on the electrostatic ion trap, mechanically decoupled from the support structure and configured to focus ions entering the electrostatic ion trap.

32. The mass spectrometer of claim 31, wherein the focusing lens is directly mounted on one or more of the barrel electrodes, wherein a deflector is directly mounted on the barrel electrode in which an ion introduction channel for injecting ions into the annular cavity is formed.

33. The mass spectrometer of claim 25, wherein the mass analyzer comprises the electrode assembly and an electrically insulating spacer, wherein the electrically insulating spacer is at the first end of the mass analyzer and forms a mounting surface for the mass analyzer and is directly engaged with the support structure.

34. The mass spectrometer of claim 33, wherein the support structure comprises one or more biasing arrangement(s) implementing spring plates, directly engaged with an outer surface of the electrically insulating spacer and one or more hardstop plates directly engaged with an inner surface of the electrically insulating spacer, wherein the inner surface of the first electrically insulating spacer is proximal to the electrode assembly of the mass analyzer and the outer surface of the first electrically insulating spacer is distal from the electrode assembly of the mass analyzer.

35. The mass spectrometer of claim 25, wherein the electrically insulating spacer is retained within a first bore formed in the support structure, wherein the diameter of the first electrically insulating spacer is approximately the same as the diameter of the first bore.

36. A method of manufacturing a mass spectrometer comprising:

providing a first ion trap for forming a linear or curved potential well;

providing a second ion trap for forming an annular potential well;

providing a lens stack connected to the first ion trap for directing ions from the first ion trap to the second ion trap;

providing a housing;

forming a unitary insert comprising a first cavity and a second cavity, wherein the first cavity is offset from the second cavity along a longitudinal axis extending through the unitary insert and intersecting the first cavity and the second cavity;

locating the lens stack in the first cavity and the second ion trap in the second cavity to form a removable assembly; and inserting the removable assembly into the housing;

wherein the removable assembly is configured such that the first ion trap is aligned with the second ion trap before the removable assembly is inserted into the housing by the lens stack being held in the first cavity and the second ion trap being held in the second cavity.

* * * * *